2 Sheets—Sheet 2.

T. C. PURVES.
Apparatus for Removing Sediment from Steam-Boilers.

No. 204,250. Patented May 28, 1878.

Witnesses.
G. L. Chapin
A. G. Morey

Inventor.
Thomas C. Purves

UNITED STATES PATENT OFFICE.

THOMAS C. PURVES, OF CHICAGO, ILLINOIS.

IMPROVEMENT IN APPARATUS FOR REMOVING SEDIMENT FROM STEAM-BOILERS.

Specification forming part of Letters Patent No. 204,250, dated May 28, 1878; application filed April 11, 1878.

*To all whom it may concern:*

Be it known that I, THOMAS C. PURVES, of Chicago, in the county of Cook and State of Illinois, have invented a new and useful Improvement in Apparatus for Removing Sediment from Steam-Boilers, of which the following is a specification:

The nature of the present invention consists, first, in an upper sediment-receiver, provided with an opening through which air passes to cool the water, in combination with a lower vessel and connecting-pipe for collecting and blowing off sediment; second, in a conical skimmer-pipe, the smaller end of which is jointed to the exit-pipe, and the larger end attached to a float, and provided with two or more large holes near to its top part for the passage of scum or sediment.

The object of making this pipe largest at its float end is that holes of sufficient size may be made therein to properly skim the surface of the water, and at the same time to hold sufficient water below the water-line in the boiler as to balance the pipe and obviate a rapid oscillating movement, which would place the holes so much of the time above the surface of the water as to skim imperfectly. By this means sediment or scum passes into the pipe in part by force of gravity, and consequently a greater amount of scum or sediment is removed than when other forces are wholly relied on, while at the same time the device is automatic in absence of further mechanism.

I am aware that cylindrical pipes with float and inverted funnels have been employed and held in place by a guide-stirrup, as shown in Patent No. 22,757. I therefore disclaim that device.

Figure 1:
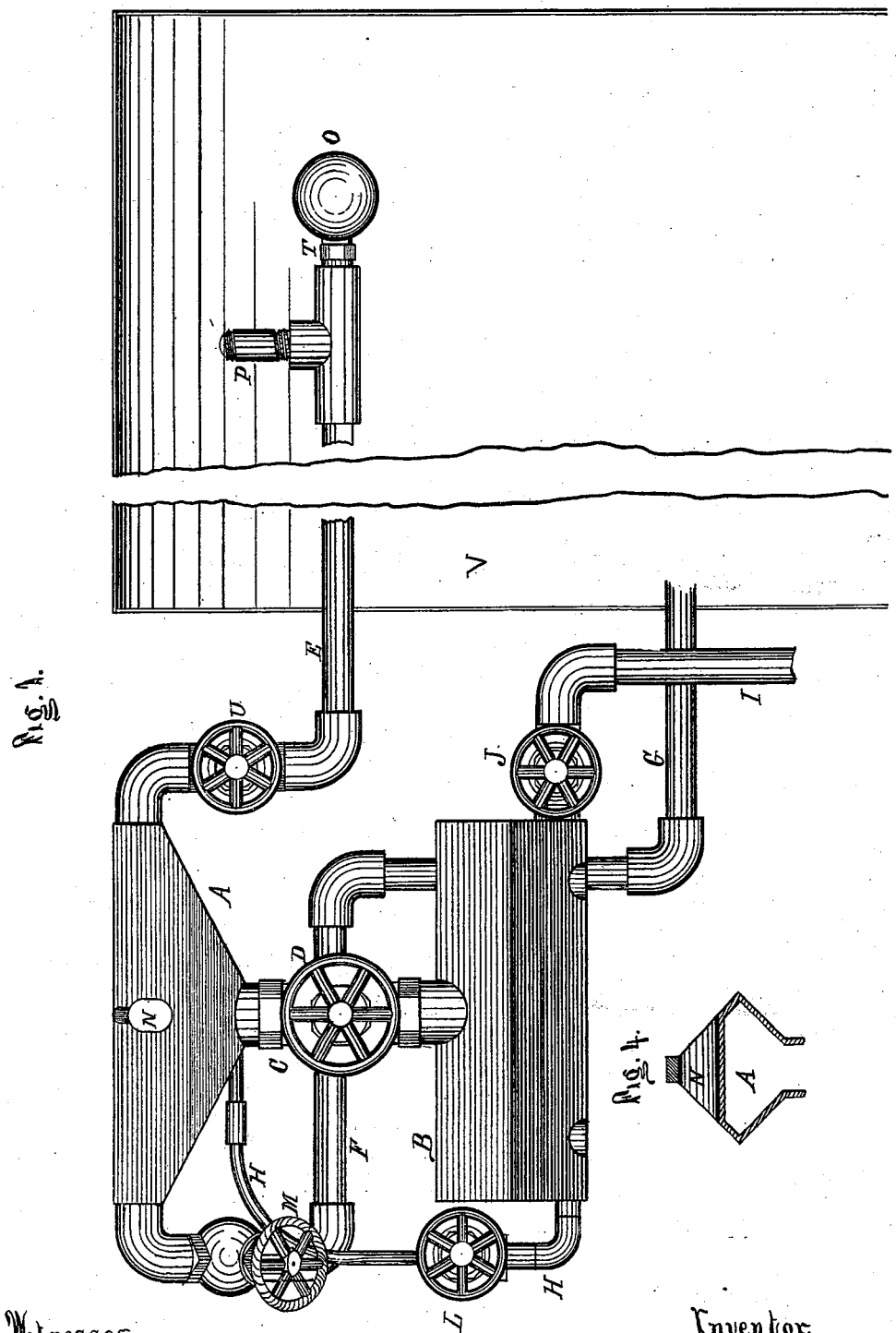
Figure 2:
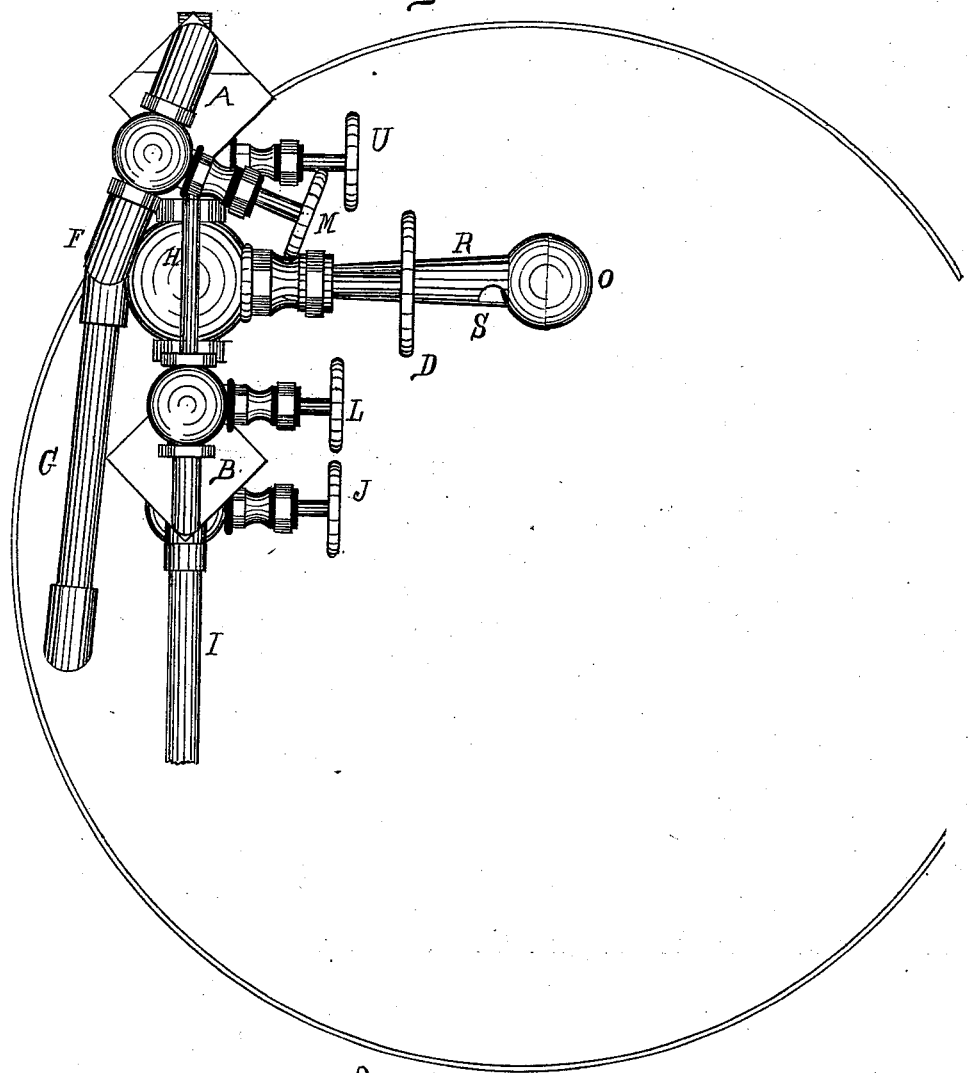
Figure 3:
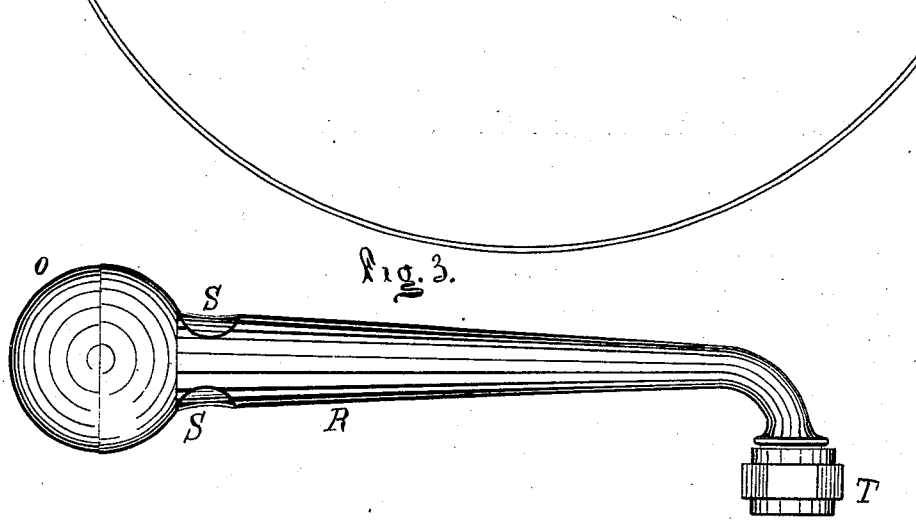

In the drawings, Figure 1, Sheet 1, represents an apparatus in which is embodied my improvement for removing sediment from steam-boilers, the apparatus in this case being located at the end of the boiler. Fig. 2, Sheet 2, is an end view of the apparatus in position on the boiler. Fig. 3 is an enlarged detached view of the conical float. Fig. 4 is a cross-section of the upper sediment-receiver, showing the cooling-pipe M.

A represents an upper receiver; B, a lower receiver; C, a pipe connecting them, and D a cock in the pipe; E, an exit-pipe, and F G the return-pipe. The pipe E and pipes F G and receiver A are the means for conducting currents of water outside of the boiler, in substantially the same manner as shown in the patent issued to me March 19, 1878. The receiver B and discharge-pipe I therefrom are also the same. The pipe H, however, connecting the lower part of receiver A with the lower part of receiver B, for blowing off the contents of B, is added, and performs an important function.

Transversely through the upper part of the receiver A is placed a cooling-pipe, N, through which cold air passes and partially cools the water in receiver A, coming in contact with it, and thereby causes sediment to precipitate to the bottom of receiver A.

The means for conducting sediment to receiver A consist of conical pipe R, jointed to pipe E at T, so that the bulbed end O may always occupy the same required position relative to the surface of the water in the boiler, whether the water be above or below the pipe E; so in any event water will enter holes S, and complete its circuit through the receiver A.

It will be seen that the holes S are formed closely to the bulb-float O and near the end of pipe R, whereby any considerable elevation or depression of the conical pipe R by different heights of water in the boiler will not, to any material extent, lessen or increase the flow of water through the receiver A.

Experiments prove that floats in a steam-boiler have to be weighted to keep them steady. By this construction the water in the pipe R serves as the necessary weight, and always keeps the bulb O steady under various pressures of steam.

Copper is the best material to use in the construction of pipe R and bulb O, and iron or brass may be used in making the receivers A and B.

The apparatus is attached to the boiler by means of the exit and inlet pipes E G, and may have an exterior support.

The sediment is drawn from A to B by means of a cock, D, and is discharged from B. By shutting cock D and opening cock L in pipe H and cock J in pipe I, the current of water under pressure of steam washes the receiver B clean.

I claim as new and desire to secure by Letters Patent of the United States—

1. In a sediment-receiver, the vessel A, provided with opening N, vessel B, and pipe H, connecting said vessels at their bottoms, constructed and arranged to collect and blow off the mud, substantially as described and shown.

2. The pipe R, made at its small end to join the exit-pipe E, and enlarged at its bulb end to hold sufficient water to balance it, and with large skimming-holes in its top part, whereby sediment passes into the pipe, in part, by its own gravity, as specified.

THOMAS C. PURVES.

Witnesses:
G. L. CHAPIN,
A. G. MOREY.